United States Patent [19]

Hoopes

[11] Patent Number: 4,474,147
[45] Date of Patent: Oct. 2, 1984

[54] COMBINED FIRE RING AND CARBON SCRAPING INSERT

[75] Inventor: Ted R. Hoopes, Rouzerville, Pa.

[73] Assignee: Mack Trucks, Inc., Allentown, Pa.

[21] Appl. No.: 329,574

[22] Filed: Dec. 10, 1981

[51] Int. Cl.³ .......................... F02F 1/00; F16J 15/04
[52] U.S. Cl. ........................... 123/193 CP; 123/668; 123/193 R; 277/235 B
[58] Field of Search ............... 123/193 H, 193 R, 671, 123/193 CH, 668; 277/212 F, 235 B, 236; 92/171, 169

[56] References Cited

U.S. PATENT DOCUMENTS

| 321,145 | 10/1929 | Pawlikowski | 123/668 |
| 2,109,814 | 3/1938 | Balfe | 277/235 B |
| 2,641,381 | 6/1953 | Bertrand | 277/236 |
| 3,080,171 | 3/1963 | Booth | 277/236 |
| 3,476,099 | 11/1969 | Packard et al. | 123/193 R |
| 3,489,130 | 1/1970 | Polidan et al. | 123/193 CP |
| 3,586,338 | 6/1971 | Miklau et al. | 277/235 B |
| 3,920,252 | 11/1975 | Dechavanne | 277/188 R |

FOREIGN PATENT DOCUMENTS 1215111 12/1970 United Kingdom ........ 123/193 CH

Primary Examiner—Craig R. Feinberg
Assistant Examiner—David A. Okonsky
Attorney, Agent, or Firm—Bernard, Rothwell & Brown

[57] ABSTRACT

A ring having an L-shaped cross section is provided for performing the functions of a fire ring, a carbon-scraping cylinder insert and for simplifying engine assembly. The ring ensures an effective seal between a cylinder head and an engine block or cylinder sleeve.

4 Claims, 2 Drawing Figures

U.S. Patent    Oct. 2, 1984    4,474,147
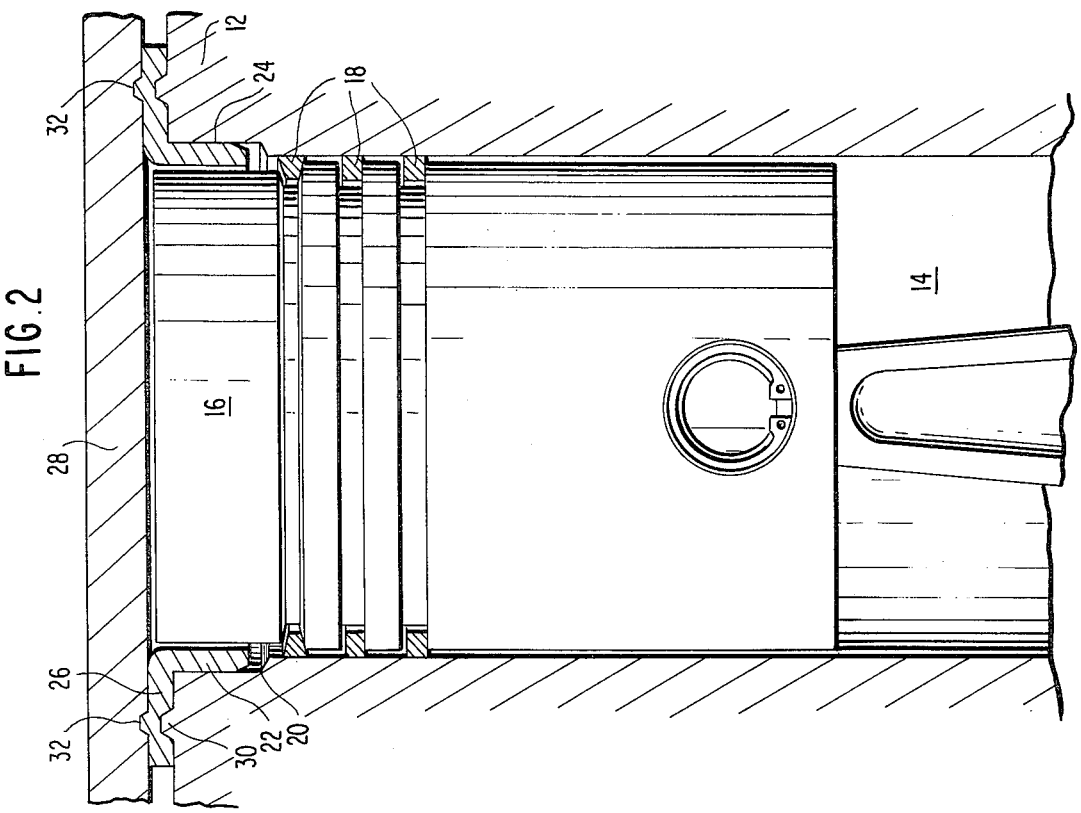
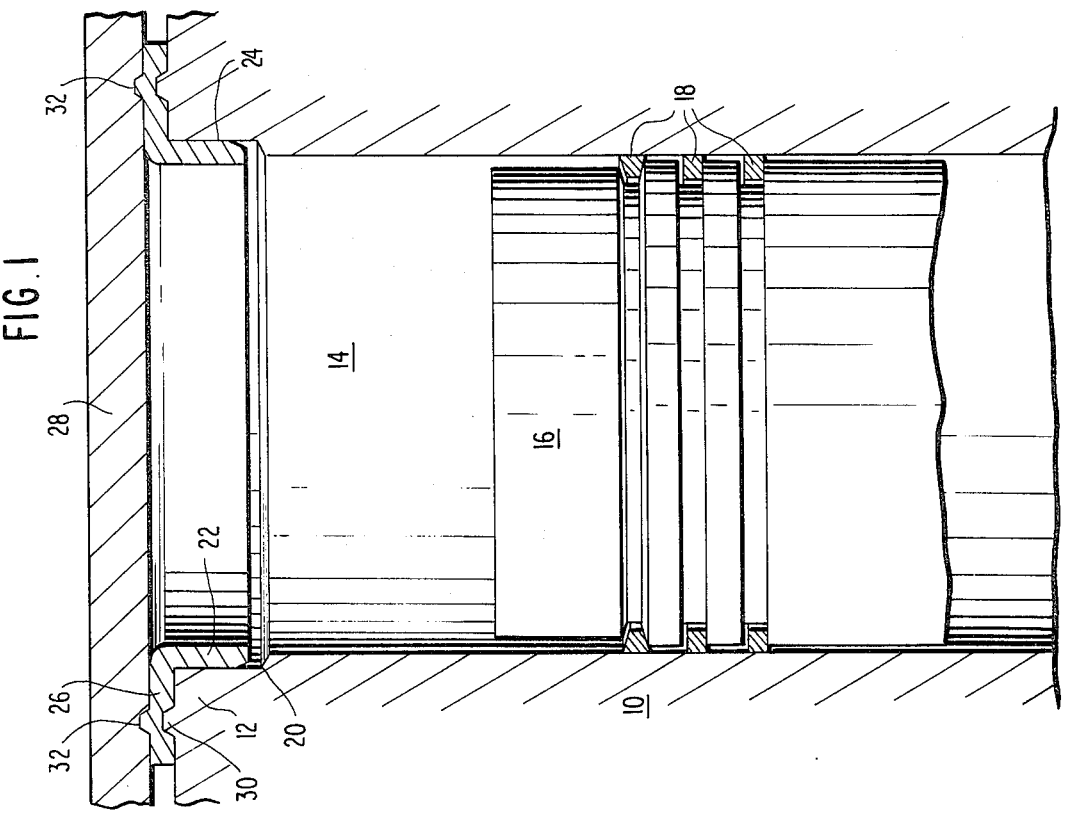

COMBINED FIRE RING AND CARBON SCRAPING INSERT

BACKGROUND OF THE INVENTION

1. Field of the Invention

This invention relates to a combined fire ring and carbon-scraping cylinder insert which simplifies engine assembly.

2. Description of the Prior Art

In high pressure internal combustion engines an effective long lasting seal at the upper end of a cylinder must be provided between the engine block and the cylinder head. In some engine designs a cylinder sleeve lines the cylinder with the top of the sleeve level with the engine block at the top of the cylinder. In engines having such a sleeve, the seal is actually formed between the cylinder head and the cylinder sleeve. Whether the seal is between the cylinder head and the engine block or between the cylinder head and the cylinder sleeve, it must be capable of withstanding both high temperatures and pressures. One arrangement for providing this seal is described in U.S. Pat. No. 3,586,338 to Ernest P. Miklau and John R. Crowe. The engine block or cylinder sleeve is provided with a bead raised above the surface of the block or sleeve around the perimeter of each cylinder. A flat annular fire ring is positioned on the engine block or cylinder sleeve during assembly to surround the cylinder at its upper end and to rest on the bead. The cylinder head is provided with grooves corresponding to the raised bead around the perimeter of each cylinder. After the fire rings are positioned, the cylinder head is placed on the block and fastened to the block securely. The bead on the block or cylinder sleeve forces a portion of the metal fire ring to conform to the contours of the groove in the cylinder head and a seal is formed.

Occasionally, problems have arisen during the fastening of the cylinder head to the engine block when a fire ring is positioned improperly or is moved out of position during the assembly process. If the fire ring's position is not corrected, an imperfect seal may be formed when the cylinder head is fastened onto the engine block or other engine parts, such as the cylinder sleeve, may crack. Apart from the possibility of defective seals or damage to engine parts, the prior art arrangement requires additional time-consuming effort to insure that each fire ring is placed in the precisely correct position to provide an effective seal.

Within an engine cylinder, carbon deposits form on piston walls above the piston rings and it is desirable to remove such deposits on a regular basis to prevent their accumulation. To accomplish this, an annular insert has been provided in a recess in the top of each cylinder, as illustrated in U.S. Pat. No. 3,489,130 to Harry L. Polidan and Norman M. Packard. The insert is positioned to scrape carbon deposits from the piston as the piston moves within the cylinder.

By the present invention the above-mentioned problems of the prior art have been eliminated. The assembly of the engine has been facilitated, assembly time reduced, and effective seals ensured. Moreover, the unitary structure of this invention not only achieves these desirable results with respect to effective seals and ease of assembly but also functions effectively as a carbon scraping insert.

Accordingly, it is an object of this invention to provide a unitary structure which is automatically positioned properly and securely to form a seal.

It is also an object of this invention to provide a unitary structure for forming a seal between the cylinder head and an engine block or cylinder sleeve which is easy to assemble.

A further object of this invention is to provide a unitary structure which combines the functions of a fire ring and a cylinder insert.

SUMMARY OF THE INVENTION

These objects are obtained, in one form of the invention, by providing a unitary structure in the form of a ring having an L-shaped cross section wherein one leg of the ring performs the functions of a fire ring and the other leg of the ring positions and holds the leg which functions as a fire ring in proper position during engine assembly and performs the functions of a cylinder insert.

BRIEF DESCRIPTION OF THE DRAWINGS

FIG. 1 is a sectional elevation view showing one embodiment of this invention wherein a piston is at the bottom of its stroke within a cylinder.

FIG. 2 is a sectional elevation view similar to FIG. 1 but showing the piston at the top of its stroke within a cylinder.

DETAILED DESCRIPTION OF THE PREFERRED EMBODIMENT OF THE INVENTION

In FIGS. 1 and 2 there is shown a portion of an engine 10 in which this invention is incorporated. The illustrated portion of the invention includes a block 12 in which a plurality of cylinders are formed, one of which is shown at 14. A piston 16 operates within each cylinder and is provided with piston rings 18. The cylinder 14 is provided with a recess 20 at the upper end thereof. The engine block preferably has a bead 30 extending around the perimeter of each cylinder. Cylinder head 28 is provided to fit on top of the engine block and preferably has a groove 32 which corresponds to the bead on the engine block surrounding each cylinder.

In accordance with this invention, a unitary structure 24 is provided which functions both as a fire ring and a carbon scraping insert. The unitary structure 24 is an annular element of L-shaped cross-section. It includes a first leg 22 which is positioned in recess 20 to scrape carbon from the walls of the piston 16 above the piston rings 18. The first leg 22 also serves to properly position second leg 26 of unitary structure 24 on the engine block 12 and holds the second leg 26 securely in position. When cylinder head 28 is placed on the block 12 and fastened to the block by tightening bolts (not shown), the first leg 22 extending into the cylinder ensures that the second leg 26 is properly positioned to form a seal between the cylinder head and the engine block 12. As the cylinder head is fastened to the engine block, the engine block bead 30 forces a portion of the second leg 26 of the unitary structure into the corresponding cylinder head groove to form a seal. The bead 30 is preferably taller than the cylinder head groove 32 is deep, but the bead and the groove may be of the same size. To enhance the formation of a seal, the ring of this invention is made of deformable metal, such as high quality carbon steel SAE 1008.

The description of this invention has been made with reference to an engine block having a raised bead surrounding each cylinder. In some engine designs a cylinder sleeve or liner is provided extending the length of the cylinder and being level with the engine block at the top of the cylinder. In such engines the raised bead may be provided on the top of the cylinder sleeve rather than on the engine block itself. When the cylinder head is fastened to the engine block, the raised bead on the cylinder liner forces a portion of the second leg 26 of the ring 24 into a corresponding groove provided in the cylinder head. The required seal is thereby formed between the cylinder head and the cylinder sleeve. By combining the fire ring and the cylinder insert into one unitary structure having an L-shaped cross-section, the portion of the ring that functions as a fire ring is automatically positioned properly and is held securely in position by the other portion of the ring which extends in the cylinder and functions as a cylinder insert. With this invention, the secure seal is ensured without the time consuming effort required to position a separate fire ring and without the possibility of damaging equipment which might otherwise occur with a separate fire ring and cylinder insert, since the portion of the unitary structure of this invention which functions as a fire ring can not be improperly positioned or jarred to an improper position during engine assembly.

I claim:

1. A combined fire ring and carbon-scraping cylinder insert for an internal combustion engine including an engine block having a cylinder formed therein and a cylinder head, said combined fire ring and carbon-scraping insert comprising:
   a. an annular member of L-shaped cross-section;
   b. said annular member comprising a first leg received in the upper end only of the cylinder and positioned to remove carbon from a piston moving in the cylinder;
   c. said annular member further comprising a second leg extending radially outwardly from and substantially perpendicular to said first leg, said second leg providing a fire ring extending between the engine block and the cylinder head in sealing engagement therewith;
   d. said first leg being received in a recess in the upper end of the cylinder to hold said second leg in fixed position between the block and the cylinder head; and
   e. said second leg extending a substantial distance radially outwardly from said first leg to provide a substantial area of contact with the engine block and the cylinder head;
   f. wherein said first and second legs are of substantially equal length and thickness.

2. A unitary structure as recited in claim 1 made of deformable metal.

3. A unitary structure as recited in claim 1 wherein a raised bead is provided on an engine block surrounding the cylinder into which said first leg extends and wherein a groove is provided in a cylinder head corresponding to said raised bead, said second leg being positioned over said raised bead on said engine block.

4. A unitary structure as recited in claim 1 wherein a raised bead is provided on a cylinder sleeve surrounding the cylinder into which said first leg extends and wherein a groove is provided in a cylinder head corresponding to said raised bead, said second leg being positioned over said raised bead on said cylinder sleeve.

* * * * *